No. 869,353. PATENTED OCT. 29, 1907.
H. J. DUNDAS.
BRICK TRUCK.
APPLICATION FILED NOV. 1, 1906.

Witnesses
Inventor
Henry James Dundas

UNITED STATES PATENT OFFICE.

HENRY JAMES DUNDAS, OF LEESIDE JUNCTION, ONTARIO, CANADA.

BRICK-TRUCK.

No. 869,353.  Specification of Letters Patent.  Patented Oct. 29, 1907.

Application filed November 1, 1906. Serial No. 341,629.

*To all whom it may concern:*

Be it known that I, HENRY JAMES DUNDAS, a subject of the King of Great Britain, residing at Leeside Junction, in the county of York, in the Province of Ontario, Canada, have invented a new and useful Improvement in a Brick-Truck, of which the following is a specification.

My invention relates to a conveying truck, such as are commonly used in connection with the manufacture of bricks; and the object of my invention is to provide means that the body of the truck may be raised and lowered on the carrying wheels.

The truck frame and the carrying axles, are coupled in combination with a series of lever arms, by which the body of the truck may be instantly lowered or raised on the carrying wheels, so that as the truck with the frame lowered is brought immediately under the brick pallets that it has been purposely constructed to convey from one point to another, the frame may be raised by the aid of one of the levers, and the pallet lifted off stands or ledges arranged on each side of the tracks the truck is to travel on.

The stands or ledges are arranged to support the pallets while the bricks or molds are being piled thereon. When the pallets have been received on the truck, they may be conveyed to the drying houses or kilns, where they may be deposited onto stands or ledges, by simply lowering the frame by the aid of one of the levers. It will be understood that the pallets will be constructed wider than the width of the truck for the purpose above specified.

Figure 1:
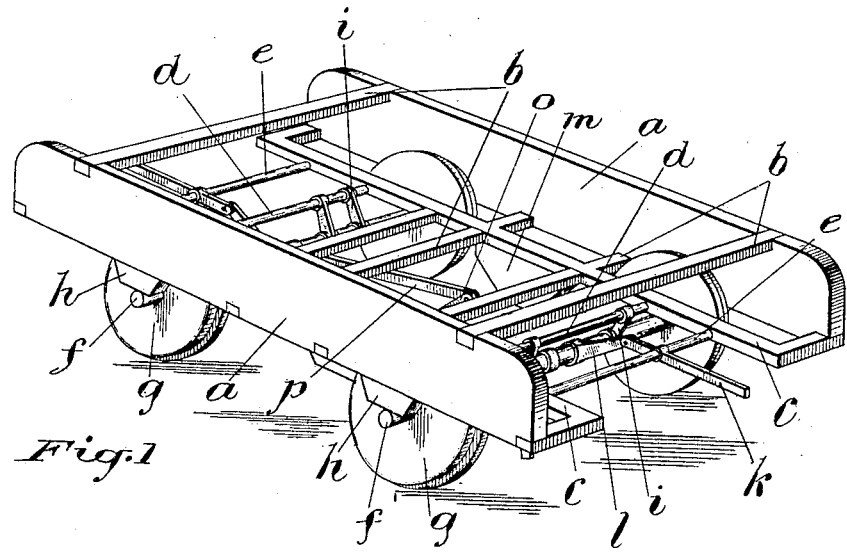
Figure 2:
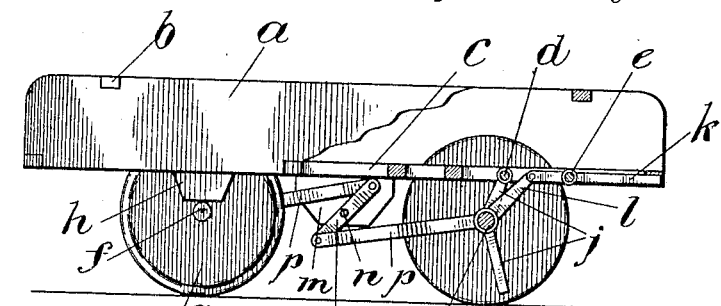
Figure 3:
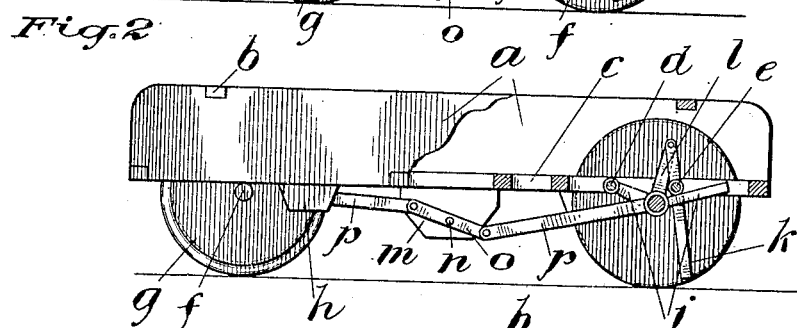
Figure 4:
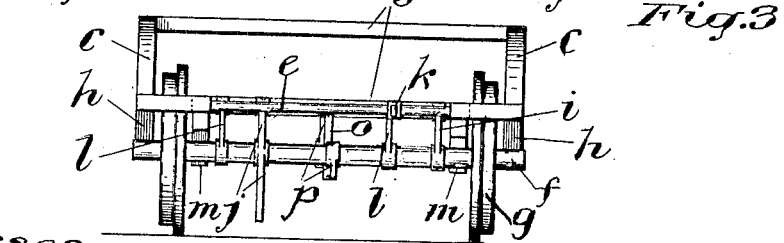

In the drawings—Figure 1 is a perspective view of the truck; Fig. 2 is a side elevation showing the frame raised; Fig. 3 is a side elevation showing the frame lowered; and, Fig. 4 is an end elevation of Fig. 2.

Like letters refer to like parts throughout the specifications and drawings.

The frame of the truck comprises in its construction two sides *a—a*, braced apart by a series of cross bars *b*. Extending the length of the sides *a—a*, in parallel relation, and intersecting with the cross bars *b*, are supporting bars *c—c*.

*d—d* designate carrying shafts, extending across the frame of the truck with their ends set in the supporting bars *c—c*. Arranged in parallel relation with the shafts *d—d*, and also having their ends set in the supporting bars *c—c*, are fulcrum shafts *e—e*.

*f—f* designate the carrying axles, and *g—g* the carrying wheels. The ends of the axles extend beyond the outer faces of the wheels, sufficiently far to engage under the bottom edges of the sides of the frame, by which it is supported.

Set on the under edges of the sides *a—a*, are bearing blocks *h—h*. The ends of the axles engage under the bottom edge of the bearing blocks when the frame of the truck is raised.

The axles and the carrying wheels are adjustably coupled with the frame of the truck by a series of coupling links *i*, one end of the link being loosely fastened to the axle *f*, and the other end is loosely fastened to the carrying shafts *d*.

*j—j* designate trip levers, mounted on the carrying axles *f—f*, one end of the lever forming a connecting link between the axle and the carrying shaft *d*. The trip levers are for the purpose of raising the frame on the axles. *k—k* designates a second trip lever, mounted on the fulcrum shaft *e*. The trip levers *k* are for the purpose of lowering the frame on the axles. The short end of the levers *k—k* are pivotally connected to a crank arm *l* mounted on the axles *f*.

Fastened in blocks *m* depending from the supporting bars *c—c*, is a shaft *n*.

*o* designates a short lever bar loosely mounted on the shaft *n*.

*p—p* designates coupling bars connecting each of the carrying axles with the lever bar *o*, so that by the operation of either of the trip levers at either end of the frame the corresponding parts at each end of the frame will operate simultaneously, and both ends of the frame raise and lower in unison.

To lower the frame on the carrying axles, the trip lever *k* which is in a horizontal position when the frame is elevated, is forced downwards into a vertical position from either end, until the carrying wheels adjust outwards to their limit. As the carrying wheels move outwards the ends of the axles disengage from under the bearing blocks *h*, and engage under the bottom edge of the sides *a—a*, and the frame lowers to the extent of the depth of the blocks *h*.

To raise the frame of the truck on the carrying axles, after it has been lowered by the levers *k*, as above described; either of the trip levers *j* which have changed from a vertical to a horizontal position, is forced downwards from either end of the frame, and the axles and carrying wheels are forced towards one another, and back under the bearing blocks *h*, and the frame is again raised to the height of the depth of the bearing blocks *h*.

It will be seen that the levers adjust themselves to be subject to downward action to raise or lower the frame, by which less power is required than if it was necessary to draw upwards on the levers.

It will be understood the adjustment of the carrying axles and wheels, will be limited to the length of the links connecting the axles with the frame. As the axles and carrying wheels are coupled together by the lever and coupling bars, both of the axles and carrying wheels will adjust in unison, by the operation of either of the levers from either end of the frame.

What I claim as new and desire to secure by Letters Patent is—

1. In a brick truck, in combination with the axles and carrying wheels, of a frame adjustably mounted on said axles, connecting links adjustably connecting said frame with said axles, operating levers engaging with said axles and frame, and operating levers engaging with said frame and axles, substantially as described.

2. In a brick truck, in combination with the axles and carrying wheels, of a frame adjustably mounted on said axles, connecting links adjustably connecting said frame with said axles, operating levers engaging with said axles and frame, and operating levers engaging with said frame and axles, a lever bar mounted in said frame, coupling bars connecting said axles with said lever bar, substantially as described.

3. In a brick truck, in combination with the carrying axles and wheels, of a frame adjustably mounted on said axles, said frame comprising sides and cross braces, connecting and fulcrum bars set in said frame, connecting links adjustably connecting said axles with said connecting bars, operating levers connecting with said axles and connecting bars, operating levers mounted on said fulcrum bars, said operating levers engaging with crank arms mounted on said axles, a lever bar mounted in said frame, coupling bars connecting said axles with said lever bars, bearing blocks set under edges of said sides of frames, substantially as described.

Signed at Toronto, this 16th day of June, 1906.

HENRY JAMES DUNDAS.

In the presence of—
M. M. SWIFT,
A. A. ADAMS.